United States Patent
Wang et al.

(10) Patent No.: US 12,206,285 B2
(45) Date of Patent: Jan. 21, 2025

(54) SYSTEM AND METHOD OF MAKING A CAST INDUCTION ROTOR ASSEMBLY HAVING CONDUCTIVE BARS

(71) Applicant: GM Global Technology Operations LLC, Detroit, MI (US)

(72) Inventors: Qigui Wang, Rochester Hills, MI (US); John S. Agapiou, Rochester Hills, MI (US); Liang Wang, Rochester Hills, MI (US); Lei Hao, Troy, MI (US); Daniel J. Wilson, Linden, MI (US); Steven L Burkholder, Archbold, OH (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 157 days.

(21) Appl. No.: 18/174,879

(22) Filed: Feb. 27, 2023

(65) Prior Publication Data
US 2024/0291332 A1    Aug. 29, 2024

(51) Int. Cl.
*H02K 1/26* (2006.01)
*H02K 15/02* (2006.01)

(52) U.S. Cl.
CPC ............. *H02K 1/26* (2013.01); *H02K 15/024* (2013.01)

(58) Field of Classification Search
CPC .. H02K 15/0012; H02K 15/024; H02K 17/20; H02K 1/26
See application file for complete search history.

(56) References Cited

U.S. PATENT DOCUMENTS

| | | | |
|---|---|---|---|
| 10,630,151 B2 * | 4/2020 | Agapiou | ............ H02K 15/0012 |
| 2020/0083786 A1 * | 3/2020 | B?ttner | ............... H02K 15/0012 |

\* cited by examiner

Primary Examiner — Leda T Pham
(74) Attorney, Agent, or Firm — Vivacqua Crane, PLLC

(57) ABSTRACT

An induction rotor assembly having conductive bars is provided. The assembly comprises a lamination stack comprising a body having a first end and second ends to define a longitudinal axis. The body has an outer circumferential portion extending from the first end to the second end. The outer portion has a plurality of walls defining open slots formed from the first end through the second end. The assembly further comprises a first ring disposed on the first end and a second ring disposed on the second end. The assembly further comprises a plurality of conductive bars extending between the first and second rings. Each conductive bar is disposed in one of the slots such that the respective conductive bar is in contact with the lamination stack and connects the first and second rings. Each bar comprises an inner portion and a conductive outer skin disposed about the inner portion.

20 Claims, 4 Drawing Sheets

SYSTEM AND METHOD OF MAKING A CAST INDUCTION ROTOR ASSEMBLY HAVING CONDUCTIVE BARS

INTRODUCTION

The present disclosure relates to induction rotor assemblies and, more particularly, systems and methods of making cast induction rotor assemblies having conductive outer layers for enhanced conductivity in vehicles.

With increasing demand of fuel efficiency and particularly reduction of greenhouse gas emissions, today's automotive industry has begun a new era of manufacturing environmentally friendly zero-emission vehicles such as battery electric vehicles. Current challenges are met by increasing motor power density, speed, and torque capability.

SUMMARY

Thus, while current induction rotor assemblies achieve their intended purpose, there is a need for a new and improved system and method of making a cast induction rotor assembly having a conductive skin layer for enhanced conductivity and reduced resistance to increase motor power density, speed, and torque capability.

In accordance with one aspect of the present disclosure, a cast induction rotor assembly having conductive bars is provided. The cast induction rotor assembly comprises a lamination stack comprising a body having a first end and an opposing second end to define a longitudinal axis. The body has an outer circumferential portion extending from the first end to the second end along the longitudinal axis. The outer circumferential portion has a plurality of walls defining open slots formed therethrough from the first end through the second end.

The assembly further comprises a first ring disposed on the first end and a second ring disposed on the second end. The assembly further comprises a plurality of conductive bars extending between the first ring and the second ring. Each conductive bar is disposed in one of the plurality of slots such that the respective conductive bar is in contact with the lamination stack wherein each conductive bar connects the first and second rings. Each conductive bar comprises an inner portion and an outer skin disposed about the inner portion. The inner portion has a first width. The outer skin has carbon nanotubes disposed thereon in a predetermined orientation for conductivity. The outer skin has a second width to define a width ratio of the first width to the second width of between 4:1 and 200:1. The outer layer has greater conductively than the inner portion.

In one embodiment, the second width is between 20 microns and 50 microns. In another embodiment, the second width is between 25 microns and 35 microns. In yet another embodiment, the second width is 30 microns. In still another embodiment, the width ratio is 120:1.

In another embodiment, the first metallic material comprises one of aluminum and copper. In yet another embodiment, the lamination stack comprises steel alloy.

In accordance with another aspect of the present disclosure, a method of making a cast induction rotor assembly for a vehicle. The method comprises providing a lamination stack comprising a body having a first end and an opposing second end to define a longitudinal axis. The body has an outer circumferential portion extending from the first end to the second end coaxial with the longitudinal axis. The outer circumferential portion has a plurality of walls defining open slots formed therethrough from the first end through the second end.

The method further comprises disposing an outer skin on each of the plurality of walls. Each outer skin extends continuously from the first end to the second end along the longitudinal axis. The outer skin has carbon nanotubes disposed thereon in a predetermined orientation for conductivity.

The method further comprises providing a negative cast mold having first cavities to form a first ring arranged to be disposed on the first end and second cavities to form a second ring arranged to be disposed on the second end. The method further comprises engaging the lamination stack with the cast mold such that the first cavities are in coaxial alignment with the first end and the second cavities are in coaxial alignment with the second end. The first cavities are in fluid communication with the second cavities.

The method further comprises melting a first metallic material at a predetermined temperature to define a molten metallic material and feeding the molten metallic material in the cast mold to fill the first and second cavities.

The method further comprises cooling the molten metallic material to form a solidified metallic material in the cast mold having dimensions of the cast induction rotor assembly. The solidified metallic material defines a plurality of conductive bars connecting the first and second rings. Each conductive bar is disposed in one of the open slots and extends from the first ring to the second ring. Each conductive bar comprises an inner portion and one of the outer skins disposed on the respective wall. The inner portion is disposed within the respective outer skin. The inner portion comprises the solidified metallic material. The inner portion has a first width and the outer skin has a second width to define a width ratio of the first width to the second width of between 4:1 and 200:1. The outer layer has greater conductively than the inner portion.

The method further comprises separating the solidified metallic material from the negative cast mold to define the cast induction rotor assembly.

In one example, the first cavities are in fluid communication with the second cavities by way of the open slots. Moreover, feeding the molten metallic material in the cast mold comprises feeding the molten metallic material through the open slots.

In another example, disposing the outer skin on each of the plurality of walls comprises wrapping each outer skin about a metallic bar to define a plurality of coated bars, each coated bar disposed in one of the open slots.

In yet another example, the method further comprises providing a plurality of ingates disposed on the cast mold and in fluid communication with the first cavities and providing a plurality of runners to connect the first cavities and the second cavities such that the first and second cavities are in fluid communication.

In another example, feeding the molten metallic material in the cast mold comprises feeding the molten metallic material through the plurality of ingates and the plurality of runners to fill the first and second cavities. In still another example, prior to feeding the molten metallic material in the cast mold, the method comprises preheating the lamination stack to between 150 degree Celsius (° C.) and 400° C.

In one example, the first metallic material comprises one of aluminum and copper and wherein the metallic bar comprises the first metallic material. In another embodiment, the predetermined temperature is between 650° C. and 900° C. In yet another example, the second width is between 20 microns and 50 microns and wherein the width ratio is 120:1. In still another example, the lamination stack comprises steel alloy.

In accordance with another aspect of the present disclosure, a system for making a cast induction rotor assembly of a vehicle is provided. The system comprises a lamination stack comprising a body having a first end and an opposing second end to define a longitudinal axis. The body has an outer circumferential portion extending from the first end to the second end coaxial with the longitudinal axis. The outer circumferential portion has a plurality of walls defining open slots formed therethrough from the first end through the second end.

The system further comprises an outer skin disposed on each of the plurality of walls, each outer skin extending continuously from the first end to the second end along the longitudinal axis. The outer skin has carbon nanotubes disposed thereon in a predetermined orientation for conductivity. The system further comprises a negative cast mold having first cavities to form a first ring arranged to be disposed on the first end and second cavities to form a second ring arranged to be disposed on the second end.

The system further comprises an engaging unit arranged to engage the lamination stack with the cast mold such that the first cavities are in coaxial alignment with the first end and the second cavities are in coaxial alignment with the second end. The first cavities are in fluid communication with the second cavities. The system further comprises a furnace arranged to melt a first metallic material at a predetermined temperature to define a molten metallic material and a feeding mechanism disposed about the cast mold and in fluid communication with the first and second cavities thereof. The feeding mechanism arranged to feed the molten metallic material in the cast mold to fill the first and second cavities.

The system further comprises a cooling unit arranged to cool the molten metallic material to form a solidified metallic material in the cast mold having dimensions of the cast induction rotor assembly. The solidified metallic material defines a plurality of conductive bars connecting the first and second rings. Each conductive bar is disposed in one of the open slots and extending from the first ring to the second ring. Each conductive bar comprises an inner portion and one of the outer skins disposed on the respective wall. The inner portion is disposed within the respective outer skin. The inner portion comprises the solidified metallic material. The inner portion has a first width and the outer skin has a second width to define a width ratio of the first width to the second width of between 4:1 and 200:1. The outer layer has greater conductively than the inner portion.

The system further comprises a separation unit arranged to separate the solidified metallic material from the negative cast mold to define the cast induction rotor assembly.

In one embodiment, the first cavities are in fluid communication with the second cavities by way of the open slots and wherein feeding the molten metallic material in the cast mold comprises feeding the molten metallic material through the open slots.

In another embodiment, the system further comprises a plurality of ingates disposed on the cast mold and in fluid communication with the first cavities and a plurality of runners to connect the first cavities and the second cavities such that the first and second cavities are in fluid communication. Each outer skin is wrapped about a metallic bar to define a plurality of coated bars. Each coated bar is disposed in one of the open slots. Moreover, the feeding mechanism is arranged to feed the molten metallic material through the plurality of ingates and the plurality of runners to fill the first and second cavities.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Embodiments of the present disclosure are systems and methods of making a cast induction rotor assembly having conductive bars that provide enhanced conductivity resulting in increased motor power density, speed, and torque capability. The cast induction rotor assembly comprises conductive bars comprising an inner portion (aluminum or copper) and an outer skin disposed about the inner portion. The outer skin is an ultra-conductive composite being a tape/film material comprised of copper and coated with aligned carbon nanotubes.

Figure 1:
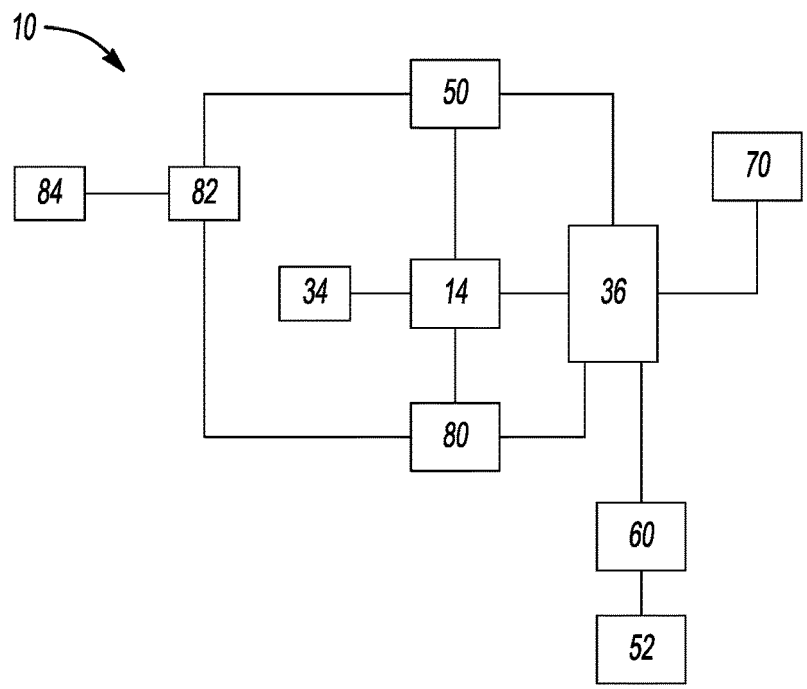
FIG. 1 is a schematic view of a system for making a cast induction rotor assembly of a vehicle in accordance with one embodiment of the present disclosure.
Figure 2A:
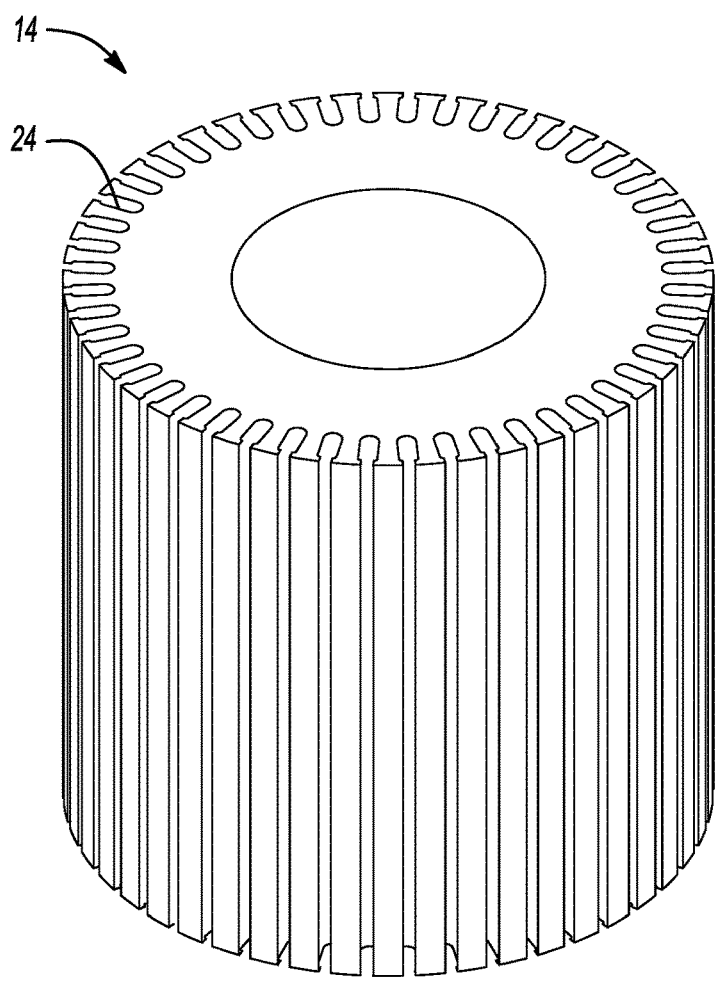
FIG. 2A is a perspective view of a metallic lamination stack of the system in FIG. 1.
Figure 2B:
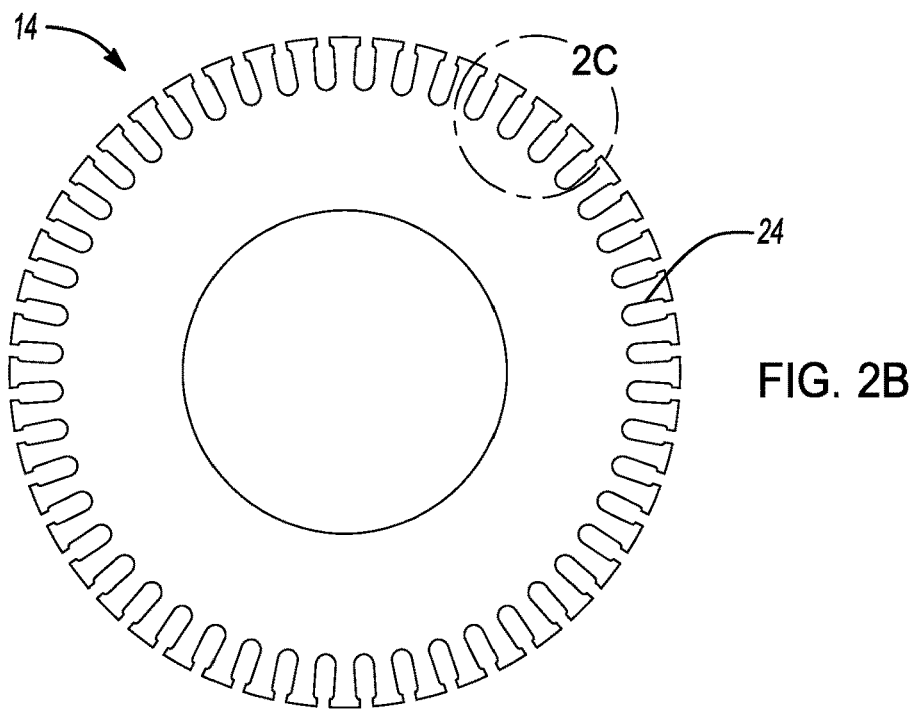
FIG. 2B is an end view of the metallic lamination stack in FIG. 2A.
Figure 2C:
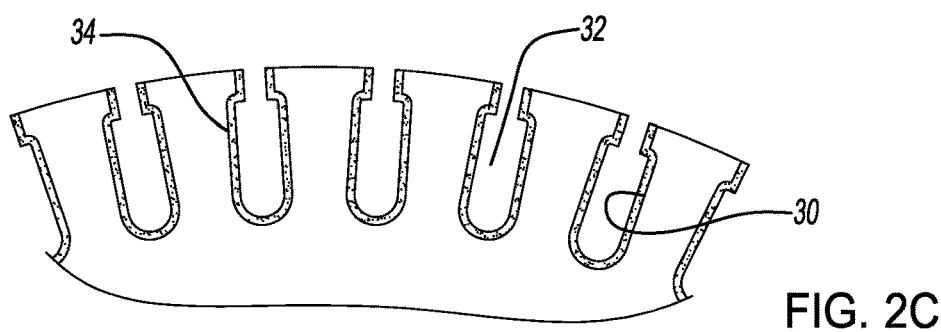
FIG. 2C is an enlarged view of the metallic lamination stack in circle 2C of FIG. 2B.

FIG. 1 depicts a system 10 for making a cast induction rotor assembly 12 (see FIG. 4A) of a vehicle in accordance with one embodiment of the present disclosure. As shown in FIGS. 1 and 2A, the system 10 comprises a lamination stack 14 comprising a body 16 having a first end 20 and an opposing second end 22 to define a longitudinal axis X. Preferably, the lamination stack 14 comprises steel alloy. Moreover, the body 16 has an outer circumferential portion 24 extending from the first end 20 to the second end 22 coaxial with the longitudinal axis. Referring to FIGS. 2A-2C, the outer circumferential portion 24 has a plurality of walls 30 defining open slots 32 formed therethrough from the first end 20 through the second end 22.

As depicted in FIGS. 2A-2C, the system 10 further comprises an outer skin 34 disposed on each of the plurality of walls 30. In this embodiment, each outer skin 34 extends continuously from the first end 20 to the second end 22 along the longitudinal axis. Preferably, at the first end 20, each outer skin 34 is bent or folded around a corner of its respective wall 30 to serve as an anchor during casting. In this embodiment, the outer skin 34 comprises carbon nanotubes disposed thereon in a predetermined orientation for enhanced conductivity. Preferably, the carbon nanotubes are disposed on the outer skin 34 in a direction along the longitudinal axis X. In this embodiment, each of the carbon nanotubes is preferably between 80 microns and 120 microns and, more preferably 100 microns. In one embodiment, the outer skin 34 may be an ultra-conductive composite being a tape/film material comprised of copper and coated with aligned carbon nanotubes.

Figure 3:
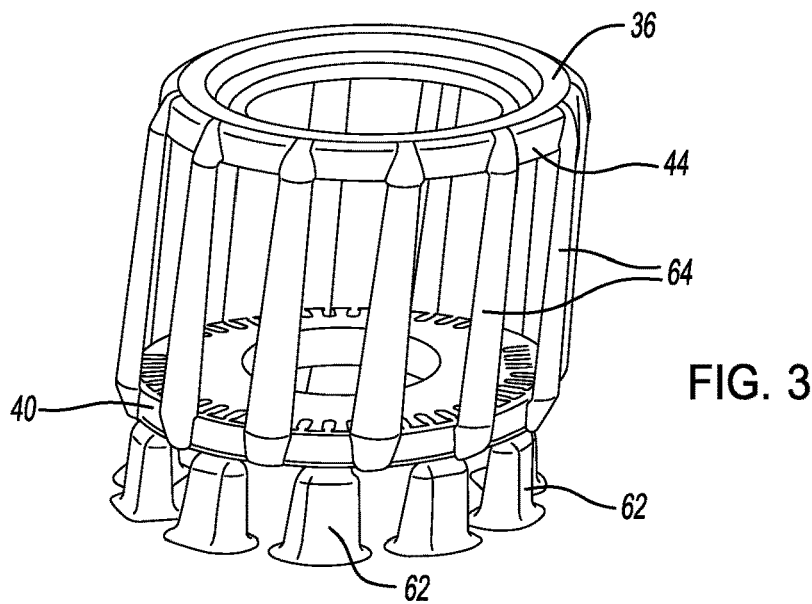
FIG. 3 is a perspective view of a feeding mechanism and a casting mold in accordance with the embodiment in FIGS. 1-2A.
Figure 4A:
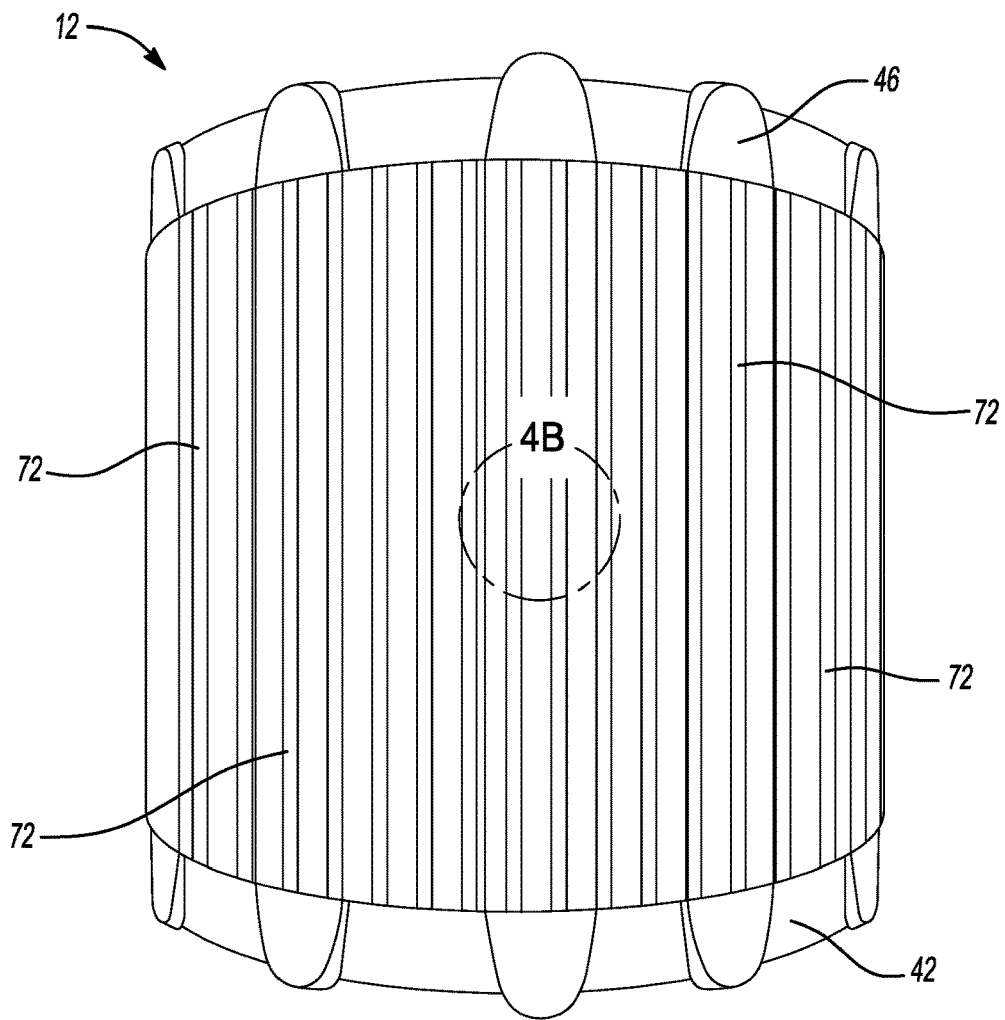
FIG. 4A is a side view of a cast induction rotor assembly made by the system of FIG. 1 in accordance with one embodiment of the present disclosure.

Referring to FIGS. 1, 3 and 4A, the system 10 further comprises a negative cast mold 36 having first cavities 40 to form a first ring 42 arranged to be engaged with or disposed on the first end 20 and second cavities 44 to form a second ring 46 arranged to be engaged with or disposed on the second end 22. In one example, the first cavities 40 are in fluid communication with the second cavities 44 by way of the open slots 32.

In a preferred embodiment, the lamination stack 14 may be preheated to between 150 degrees Celsius (° C.) and 400° C. Preheating the lamination stack 14 may be accomplished by way of a heater or a heating unit or by any other suitable manner without departing from the spirit or scope of the present disclosure.

Referring back to FIG. 1, the system 10 further comprises an engaging unit 50 disposed adjacent the lamination stack 14 and arranged to engage the lamination stack 14 with the cast mold 36 such that the first cavities 40 are in coaxial alignment with the first end 20 and the second cavities 44 are in coaxial alignment with the second end 22. In this embodiment, the first cavities 40 are in fluid communication with the second cavities 44 by way of the open slots 32. The engaging unit 50 may be any suitable mechanical device such as robotic arms to engage the lamination stack 14 with the cast mold 36 without departing from the spirit or scope of the present disclosure.

Moreover, the system 10 further comprises a furnace 52 disposed adjacent the lamination stack 14 and arranged to melt a first metallic material at a predetermined temperature to define a molten metallic material. Preferably, the first metallic material comprises one of aluminum and copper. In one embodiment wherein the first metallic material comprises copper, the predetermined temperature is between 800 degrees Celsius (° C.) and 900° C. In another embodiment wherein the first metallic material comprises aluminum, the predetermined temperature is between 150° C. and 250° C.

As depicted in FIGS. 1 and 3, the system 10 further comprises a feeding mechanism 60 disposed about the cast mold 36 and in fluid communication with the first and second cavities 40, 44 thereof. The feeding mechanism 60 is arranged to feed the molten metallic material in the cast mold 36 to fill the first and second cavities 40, 44. In one example, the feeding mechanism 60 is arranged to feed the molten metallic material in the cast mold 36 through the open slots 32 forming the first and second rings 42, 46. Moreover, each outer skin 34 is anchored to the first end as each outer skin is bent or folded around a corner of its respective wall 30. Preferably, at the first end 20, each outer skin 34 is bent or folded around a corner of its respective wall 30 to serve as an anchor during casting.

At the predetermined temperature, diffusion between the molten metallic material and the outer skin 34 occurs and is discussed in greater detail below.

Referring to FIG. 3, the feeding mechanism 60 may comprise a plurality of ingates 62 disposed on the cast mold 36 and in fluid communication with the first cavities 40. In one example, the feeding mechanism 60 may further comprise a plurality of runners 64 in fluid communication with the plurality of ingates 62 to connect the first cavities 40 and the second cavities 44. However, it is to be understood that, in this embodiment, since the first and second cavities 40, 44 are in fluid communication by way of the open slots 32, the plurality of runners 64 may be optional. As such, the feeding mechanism 60 feeds the molten metallic material through the plurality of ingates 62 to the mold 36 and through the plurality of runners 64 to fill the first and second cavities 40, 44.

Figure 4B:
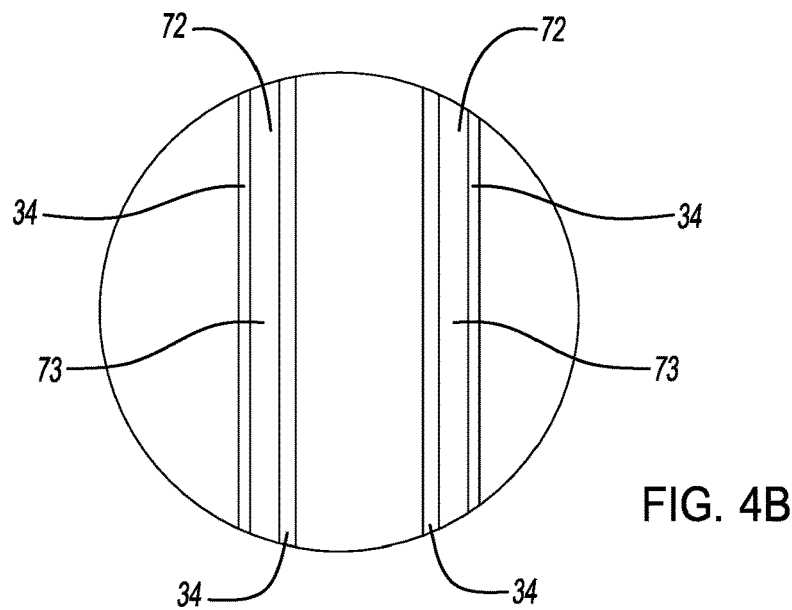
FIG. 4B is an enlarged view of conductive bars in circle 4B of FIG. 4A.

As shown in FIGS. 1, 4A, and 4B, the system 10 further comprises a cooling unit 70 arranged to cool the molten metallic material to form a solidified metallic material in the cast mold 36 having dimensions of the cast induction rotor assembly 12. The solidified metallic material defines a plurality of conductive bars 72 connecting the first and second rings 42, 46. Thus, each conductive bar 72 comprises the first metallic material (aluminum or copper). Moreover, the cooling unit 70 may be any suitable mechanism to cool the molten metallic material such as a cooling bin, a cooling area, a cooling bath using air, nitrogen or any suitable cooling fluid without departing from the scope or spirit of the present disclosure.

As depicted in FIGS. 4A and 4B, each conductive bar 72 is formed or disposed in one of the open slots 32 and extends from the first ring 42 to the second ring 46. Moreover, each conductive bar 72 comprises an inner portion 73 and one of the outer skins 34 disposed on the respective wall. The inner portion 73 is disposed within the respective outer skin 34. Additionally, the inner portion 73 comprises the solidified metallic material.

In this embodiment, the inner portion 73 has a first width and the outer skin 34 has a second width to define a width ratio of the first width to the second width of between 4:1 and 200:1. Additionally, the width ratio may be 120:1, 100:1, 175:1, 150:1, 125:1, 100:1, 75:1, 50:1, 25:1, 10:1, and 5:1. In one embodiment, the second width may be between 20 microns and 50 microns, 25 microns, 30 microns, 35 microns, 40 microns, and 45 microns. Furthermore, the outer skin 34 has greater conductively than the inner portion 73.

During cooling, the cooling unit 70 cools the outer skin 34 and the inner portion 73 of each conductive bar 72 such that diffusion bonding occurs between the inner portion 73 and the outer skin 34, defining a diffusion bond. Additionally, the diffusion bond between the inner portion 73 and the outer skin 34 is free of an intermetallic phase.

As known, diffusion bonding operates on the principle of solid-state diffusion wherein atoms of a first solid metallic surface intersperse with a second solid metallic surface over thermal treatment or heat. The surfaces are then cooled to form diffusion bonding. Here, atoms of the outer skin 34 intersperse with atoms of the inner portion 73 (and vice-versa) at the predetermined temperature during casting and diffusion bonding occurs during cooling. Moreover, the diffusion bonding between the inner portion 73 and the outer skin 34 occurs free of an intermetallic phase between the inner portion 73 and the outer skin 34. That is, the diffusion bonding between the inner portion 73 and the outer skin 34 is free of any residual formations therebetween that compromise the integrity of the bond.

The system 10 further comprises a separation unit 80 arranged to separate the solidified metallic material from the negative cast mold 36 to define the cast induction rotor assembly 12 in FIGS. 4A and 4B. It is to be understood that the separation unit 80 may be any mechanism such as a mechanical device, a robotic arm, or any other suitable mechanism to separate the solidified metallic material from the negative cast mold 36 without departing from the spirit or scope of the present disclosure.

As depicted in FIG. 1, the system 10 further comprises at least one controller 82 in communication with the engaging unit 50, the furnace 52, the feeding mechanism 60, the cooling unit 70, and the separation unit 80. The controller 82 is arranged to control the engaging unit 50, the furnace 52, the feeding mechanism 60, the cooling unit 70, and the separation unit 80. The system 10 further comprises a power source 84 arranged to power the engaging unit 50, the furnace 52, the feeding mechanism 60, the cooling unit 70, the separation unit 80 and the controller 82.

Figure 5:
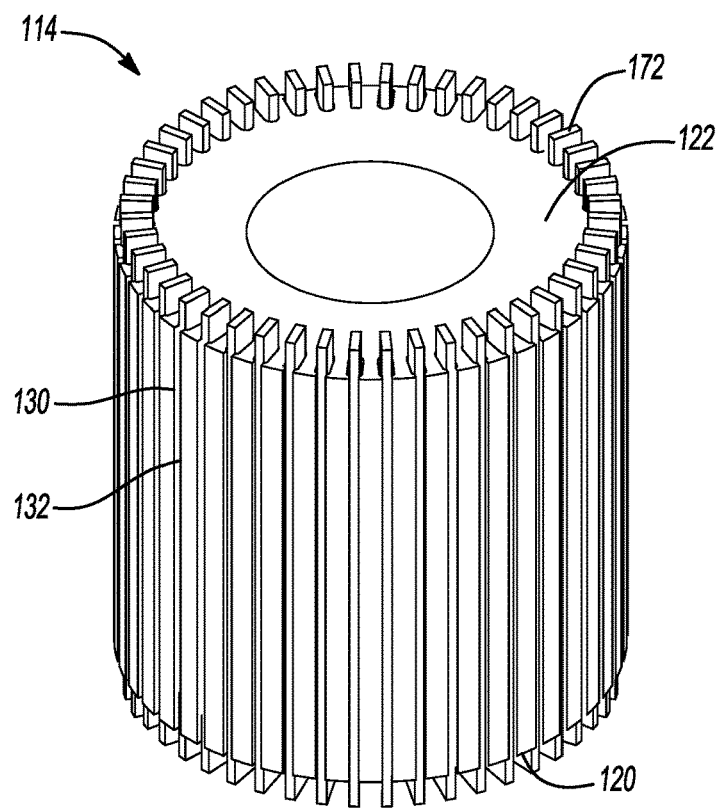
FIG. 5 is a perspective view of another lamination stack having conductive bars in accordance with another embodiment of the present disclosure.

FIG. 5 illustrates another embodiment of a lamination stack 114 having a first end 120 and a second end 122. As shown, a plurality of walls 130 defining open slots 132 are formed from the first end 20 to the second end 122 through which conductive bars 172 are disposed. Each conductive bar 172 comprises an inner portion and an outer skin 134 disposed about the inner portion. Each conductive bar 172 may be disposed in one of the open slots 132 prior to the feeding mechanism 60 (see FIG. 1) feeding molten metallic material in the cast mold 36. In this embodiment, the plurality of runners 64 (see FIG. 3) is used to connect the first cavities 40 and the second cavities 44 such that the first and second cavities 40, 44 are in fluid communication, allowing molten metallic material therethrough to fill the first and second cavities 40, 44 and form the first and second rings 42, 46.

FIGS. 4A and 4B illustrate the cast induction rotor assembly 12 casted by the system 10 in FIG. 1. As shown, the assembly 12 comprises the plurality conductive bars 72 wherein each conductive bar 72 has the conductive outer skin 34, comprising carbon nanotubes, disposed about an inner portion 73 for enhanced conductivity and reduced resistance. As shown, the plurality of conductive bars 72 extends between the first ring 42 and the second ring 46. Each conductive bar 72 is disposed in one of the plurality of slots 32 (FIG. 4B) such that the respective conductive bar 72 is in contact with the lamination stack 14. As shown, each conductive bar 72 connects the first and second rings 42, 46.

Figure 6:
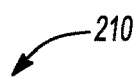
FIG. 6 is a flowchart of a method of making a cast induction rotor assembly for a vehicle in accordance with one example of the present disclosure.

FIG. 6 depicts a method of making a cast induction rotor assembly for a vehicle in accordance with one example of the present disclosure. In this example, the method may be implemented by the system 10 of FIG. 1. As shown, the method comprises in box 212 providing a lamination stack 14 (see FIG. 2A) comprising a body 16 having a first end 20 and an opposing second end 22 to define a longitudinal axis. Preferably, the lamination stack 14 comprises steel alloy. Moreover, the body 16 has an outer circumferential portion 24 extending from the first end 20 to the second end 22 coaxial with the longitudinal axis. Referring to FIGS. 2A-2C, the outer circumferential portion 24 has a plurality of walls 30 defining open slots 32 formed therethrough from the first end 20 through the second end 22.

As shown in FIG. 6, the method further comprises in box 214 disposing an outer skin 34 on each of the plurality of walls 30. In this example, each outer skin 34 extends continuously from the first end 20 to the second end 22 along the longitudinal axis. Preferably, at the first end 20, each outer skin 34 is bent or folded around a corner of its respective wall 30 to serve as an anchor during casting. The outer skin 34 has carbon nanotubes disposed thereon in a predetermined orientation for conductivity. In this example, the outer skin 34 comprises carbon nanotubes disposed thereon in a predetermined orientation for enhanced conductivity. Preferably, the carbon nanotubes are disposed on the outer skin 34 in a direction along the longitudinal axis X. In this embodiment, each of the carbon nanotubes is preferably between 80 microns and 120 microns and, more preferably 100 microns.

Referring to FIG. 6, the method further comprises in box 216 providing a negative cast mold (see FIGS. 1 and 3) having first cavities 40 to form a first ring 42 arranged to be disposed on the first end 20 and second cavities 44 to form a second ring 46 arranged to be disposed on the second end 22. In one example, the first cavities 40 are in fluid communication with the second cavities 44 by way of the open slots 32.

In a preferred embodiment, the lamination stack 14 may be preheated to between 150 degrees Celsius (° C.) and 400° C. Preheating the lamination stack 14 may be accomplished by way of a heater or a heating unit or by any other suitable manner without departing from the spirit or scope of the present disclosure.

As depicted in FIG. 6, the method further comprises in box 218 engaging the lamination stack 14 with the cast mold 36 such that the first cavities 40 are in coaxial alignment with the first end 20 and the second cavities 44 are in coaxial alignment with the second end 22. The first cavities 40 are in fluid communication with the second cavities 44. In this example, the first cavities 40 are in fluid communication with the second cavities 44 by way of the open slots 32. In this example, the engaging unit 50 of the system 10 in FIG. 1 may be implemented to engage the lamination stack 14 with the cast mold 36.

The method further comprises in box 220 melting a first metallic material at a predetermined temperature to define a molten metallic material. Preferably, the first metallic material comprises one of aluminum and copper. In one embodiment wherein the first metallic material comprises copper, the predetermined temperature is between 800 degrees Celsius (° C.) and 900° C. In another embodiment wherein the first metallic material comprises aluminum, the predetermined temperature is between 150° C. and 250° C. In this example, the furnace 52 of the system 10 in FIG. 1 may be implemented to melt the first metallic material.

Referring to FIG. 6, the method further comprises in box 222 feeding the molten metallic material in the cast mold 36 to fill the first and second cavities 40, 44. In this example, the feeding mechanism 60 of the system 10 in FIG. 1 may be implemented to feed the molten metallic material in the cast mold 36. In one example, molten metallic material is fed in the cast mold 36 through the open slots 32 forming the first and second rings 42, 46. In this example, each outer skin 34 is anchored to the first end as each outer skin is bent or folded around a corner of its respective wall 30. At the predetermined temperature, diffusion between the molten metallic material and the outer skin 34 occurs and is discussed in greater detail below.

The method further comprises in box 224 cooling the molten metallic material to form a solidified metallic material in the cast mold 36 having dimensions of the cast induction rotor assembly. The solidified metallic material defines a plurality of conductive bars 72 connecting the first and second rings 42, 46. Thus, each conductive bar 72 comprises the first metallic material (aluminum or copper).

Moreover, the cooling unit 70 of the system 10 in FIG. 1 may be implemented to cool the molten metallic material.

As discussed above and depicted in FIGS. 4A and 4B, each conductive bar 72 is formed or disposed in one of the open slots 32 and extends from the first ring 42 to the second ring 46. Moreover, each conductive bar 72 comprises an inner portion 73 and one of the outer skins 34 disposed on the respective wall. The inner portion 73 is disposed within the respective outer skin 34. Additionally, the inner portion 73 comprises the solidified metallic material.

In this embodiment, the inner portion 73 has a first width and the outer skin 34 has a second width to define a width ratio of the first width to the second width of between 4:1 and 200:1. Additionally, the width ratio may be 120:1, 100:1, 175:1, 150:1, 125:1, 100:1, 75:1, 50:1, 25:1, 10:1, and 5:1. In one embodiment, the second width may be between 20 microns and 50 microns, 25 microns, 30 microns, 35 microns, 40 microns, and 45 microns. Furthermore, the outer skin 34 has greater conductively than the inner portion 73.

During cooling, the outer skin 34 and the inner portion 73 of each conductive bar 72 is cooled such that diffusion bonding occurs between the inner portion 73 and the outer skin 34, defining a diffusion bond. Additionally, the diffusion bond between the inner portion 73 and the outer skin 34 is free of an intermetallic phase.

As known, diffusion bonding operates on the principle of solid-state diffusion wherein atoms of a first solid metallic surface intersperse with a second solid metallic surface over thermal treatment or heat. The surfaces are then cooled to form diffusion bonding. Here, atoms of the outer skin 34 intersperse with atoms of the inner portion 73 (and vice-versa) at the predetermined temperature during casting and diffusion bonding occurs during cooling. Moreover, the diffusion bonding between the inner portion 73 and the outer skin 34 occurs free of an intermetallic phase between the inner portion 73 and the outer skin 34. That is, the diffusion bonding between the inner portion 73 and the outer skin 34 is free of any residual formations therebetween that compromise the integrity of the bond.

The method further comprises in box 226 separating the solidified metallic material from the negative cast mold 36 to define the cast induction rotor assembly as shown in FIGS. 4A and 4B. In this example, the separation unit 80 of the system 10 in FIG. 1 may be implemented to separate the solidified metallic material from the negative cast mold 36.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A cast induction rotor assembly having conductive bars, the cast induction rotor assembly comprising:
   a lamination stack comprising a body having a first end and an opposing second end to define a longitudinal axis, the body having an outer circumferential portion extending from the first end to the second end along the longitudinal axis, the outer circumferential portion having a plurality of walls defining open slots formed therethrough from the first end through the second end;
   a first ring disposed on the first end;
   a second ring disposed on the second end; and
   a plurality of conductive bars extending between the first ring and the second ring, each conductive bar disposed in one of the open slots such that the respective conductive bar is in contact with the lamination stack, each conductive bar connecting the first and second rings, each conductive bar comprising an inner portion and an outer skin disposed about the inner portion, the inner portion having a first width, the outer skin having carbon nanotubes disposed thereon in a predetermined orientation for conductivity, the outer skin having a second width to define a width ratio of the first width to the second width of between 4:1 and 200:1, the outer skin having greater conductively than the inner portion.

2. The assembly of claim 1 wherein the second width is between 20 microns and 50 microns.

3. The assembly of claim 1 wherein the second width is between 25 microns and 35 microns.

4. The assembly of claim 1 wherein the second width is 30 microns.

5. The assembly of claim 1 wherein the width ratio is 120:1.

6. The assembly of claim 1 wherein the inner portion comprises one of aluminum and copper.

7. The assembly of claim 1 wherein the lamination stack comprises steel alloy.

8. A method of making a cast induction rotor assembly for a vehicle, the method comprising:
   providing a lamination stack comprising a body having a first end and an opposing second end to define a longitudinal axis, the body having an outer circumferential portion extending from the first end to the second end coaxial with the longitudinal axis, the outer circumferential portion having a plurality of walls defining open slots formed therethrough from the first end through the second end;
   disposing an outer skin on each of the plurality of walls, each outer skin extending continuously from the first end to the second end along the longitudinal axis, the outer skin having carbon nanotubes disposed thereon in a predetermined orientation for conductivity;
   providing a negative cast mold having first cavities to form a first ring arranged to be disposed on the first end and second cavities to form a second ring arranged to be disposed on the second end;
   engaging the lamination stack with the negative cast mold such that the first cavities are in coaxial alignment with the first end and the second cavities are in coaxial alignment with the second end, the first cavities being in fluid communication with the second cavities;
   melting a first metallic material at a predetermined temperature to define a molten metallic material;
   feeding the molten metallic material in the negative cast mold to fill the first and second cavities;
   cooling the molten metallic material to form a solidified metallic material in the negative cast mold having dimensions of the cast induction rotor assembly, the solidified metallic material defining a plurality of conductive bars connecting the first and second rings, each conductive bar disposed in one of the open slots and extending from the first ring to the second ring, each conductive bar comprising an inner portion and one of the outer skins disposed on the respective wall, the inner portion being disposed within the respective outer skin, the inner portion comprising the solidified metallic material, the inner portion having a first width and the outer skin having a second width to define a width ratio of the first width to the second width of between 4:1 and 200:1, the outer layer skin having greater conductively than the inner portion; and separating the solidified metallic material from the negative cast mold to define the cast induction rotor assembly.

9. The method of claim 8 wherein the first cavities are in fluid communication with the second cavities by way of the open slots and wherein feeding the molten metallic material in the negative cast mold comprises feeding the molten metallic material through the open slots.

10. The method of claim 8 wherein disposing the outer skin on each of the plurality of walls comprises wrapping each outer skin about a metallic bar to define a plurality of coated bars, each coated bar disposed in one of the open slots.

11. The method of claim 10 wherein further comprising:
providing a plurality of ingates disposed on the negative cast mold and in fluid communication with the first cavities; and
providing a plurality of runners to connect the first cavities and the second cavities such that the first and second cavities are in fluid communication.

12. The method of claim 11 wherein feeding the molten metallic material in the negative cast mold comprises feeding the molten metallic material through the plurality of ingates and the plurality of runners to fill the first and second cavities.

13. The method of claim 8 further comprising:
prior to feeding the molten metallic material in the negative cast mold, preheating the lamination stack to between 150 degree Celsius (° C.) and 400° C.

14. The method of claim 10 wherein the first metallic material comprises one of aluminum and copper and wherein the metallic bar comprises the first metallic material.

15. The method of claim 8 wherein the predetermined temperature is between 650° C. and 900° C.

16. The method of claim 8 wherein the second width is between 20 microns and 50 microns and wherein the width ratio is 120:1.

17. The method of claim 8 wherein the lamination stack comprises steel alloy.

18. A system for making a cast induction rotor assembly of a vehicle, the system comprising:
a lamination stack comprising a body having a first end and an opposing second end to define a longitudinal axis, the body having an outer circumferential portion extending from the first end to the second end coaxial with the longitudinal axis, the outer circumferential portion having a plurality of walls defining open slots formed therethrough from the first end through the second end;
an outer skin disposed on each of the plurality of walls, each outer skin extending continuously from the first end to the second end along the longitudinal axis, the outer skin having carbon nanotubes disposed thereon in a predetermined orientation for conductivity;
a negative cast mold having first cavities to form a first ring arranged to be disposed on the first end and second cavities to form a second ring arranged to be disposed on the second end;
an engaging unit arranged to engage the lamination stack with the negative cast mold such that the first cavities are in coaxial alignment with the first end and the second cavities are in coaxial alignment with the second end, the first cavities being in fluid communication with the second cavities;
a furnace arranged to melt a first metallic material at a predetermined temperature to define a molten metallic material;
a feeding mechanism disposed about the negative cast mold and in fluid communication with the first and second cavities thereof, the feeding mechanism arranged to feed the molten metallic material in the negative cast mold to fill the first and second cavities;
a cooling unit arranged to cool the molten metallic material to form a solidified metallic material in the negative cast mold having dimensions of the cast induction rotor assembly, the solidified metallic material defining a plurality of conductive bars connecting the first and second rings, each conductive bar disposed in one of the open slots and extending from the first ring to the second ring, each conductive bar comprising an inner portion and one of the outer skins disposed on the respective wall, the inner portion being disposed within the respective outer skin, the inner portion comprising the solidified metallic material, the inner portion having a first width and the outer skin having a second width to define a width ratio of the first width to the second width of between 4:1 and 200:1, the outer skin having greater conductively than the inner portion; and
a separation unit arranged to separate the solidified metallic material from the negative cast mold to define the cast induction rotor assembly.

19. The system of claim 18 wherein the first cavities are in fluid communication with the second cavities by way of the open slots and wherein feeding the molten metallic material in the cast mold comprises feeding the molten metallic material through the open slots.

20. The system of claim 18 further comprising:
providing a plurality of ingates disposed on the negative cast mold and in fluid communication with the first cavities; and
providing a plurality of runners to connect the first cavities and the second cavities such that the first and second cavities are in fluid communication,
wherein each outer skin is wrapped about a metallic bar to define a plurality of coated bars, each coated bar being disposed in one of the open slots,
wherein the feeding mechanism is arranged to feed the molten metallic material through the plurality of ingates and the plurality of runners to fill the first and second cavities.

* * * * *